United States Patent [19]
Imai

[11] Patent Number: 5,268,843
[45] Date of Patent: Dec. 7, 1993

[54] ENGINE MISFIRING DETERMINING DEVICE

[75] Inventor: Ryuichiro Imai, Tokyo, Japan

[73] Assignee: Fuji Jukogyo Kabushiki Kaisha, Tokyo, Japan

[21] Appl. No.: 635,370

[22] Filed: Dec. 26, 1990

[30] Foreign Application Priority Data

Dec. 28, 1989 [JP] Japan .................................. 1-341363

[51] Int. Cl.$^5$ ............................................. F02D 41/02
[52] U.S. Cl. .............................. 364/431.08; 123/425; 123/435; 123/487
[58] Field of Search ....................... 364/431.11, 431.08; 123/478, 425, 435, 487, 419, 417, 415, 421; 73/117.3, 118.2

[56] References Cited

U.S. PATENT DOCUMENTS

| | | | |
|---|---|---|---|
| 4,302,814 | 11/1981 | Full et al. | 364/431.04 |
| 4,562,818 | 1/1986 | Kohama et al. | 364/431.08 |
| 4,697,561 | 10/1987 | Citron | 364/431.07 |
| 4,788,956 | 12/1988 | Suzuki et al. | 364/431.11 |
| 4,932,379 | 1/1990 | Tang et al. | 123/436 |
| 4,986,232 | 1/1991 | Richter et al. | 123/481 |
| 5,021,960 | 6/1991 | Manaka et al. | 364/431.05 |
| 5,035,220 | 7/1991 | Uchinami et al. | 123/436 |
| 5,041,980 | 8/1991 | Maddock et al. | 364/431.07 |
| 5,093,792 | 3/1992 | Taki et al. | 364/431.08 |

Primary Examiner—Vincent N. Trans
Attorney, Agent, or Firm—Beveridge, DeGrandi, Weilacher & Young

[57] ABSTRACT

The device for monitoring the combustion state of each cylinder is provided in a multi-cylinder engine and determining if combustion abnormality occurs in the cylinder. The misfiring determining circuit compares an engine speed of a previous interval with that of a current interval, calculates the speed variation of a cylinder between both intervals, and determines the misfiring level by comparing the variation with the misfiring determining level. A cylinder misfiring time counting circuit counts the misfiring time of each cylinder and informs a cylinder misfiring time calculating circuit of the counting result. The cylinder misfiring time calculating circuit serves to average the misfiring time. A cylinder abnormal misfiring determining circuit compares the average misfiring time with a predetermined misfiring time maximum value for detecting the abnormal misfiring in each cylinder.

2 Claims, 17 Drawing Sheets

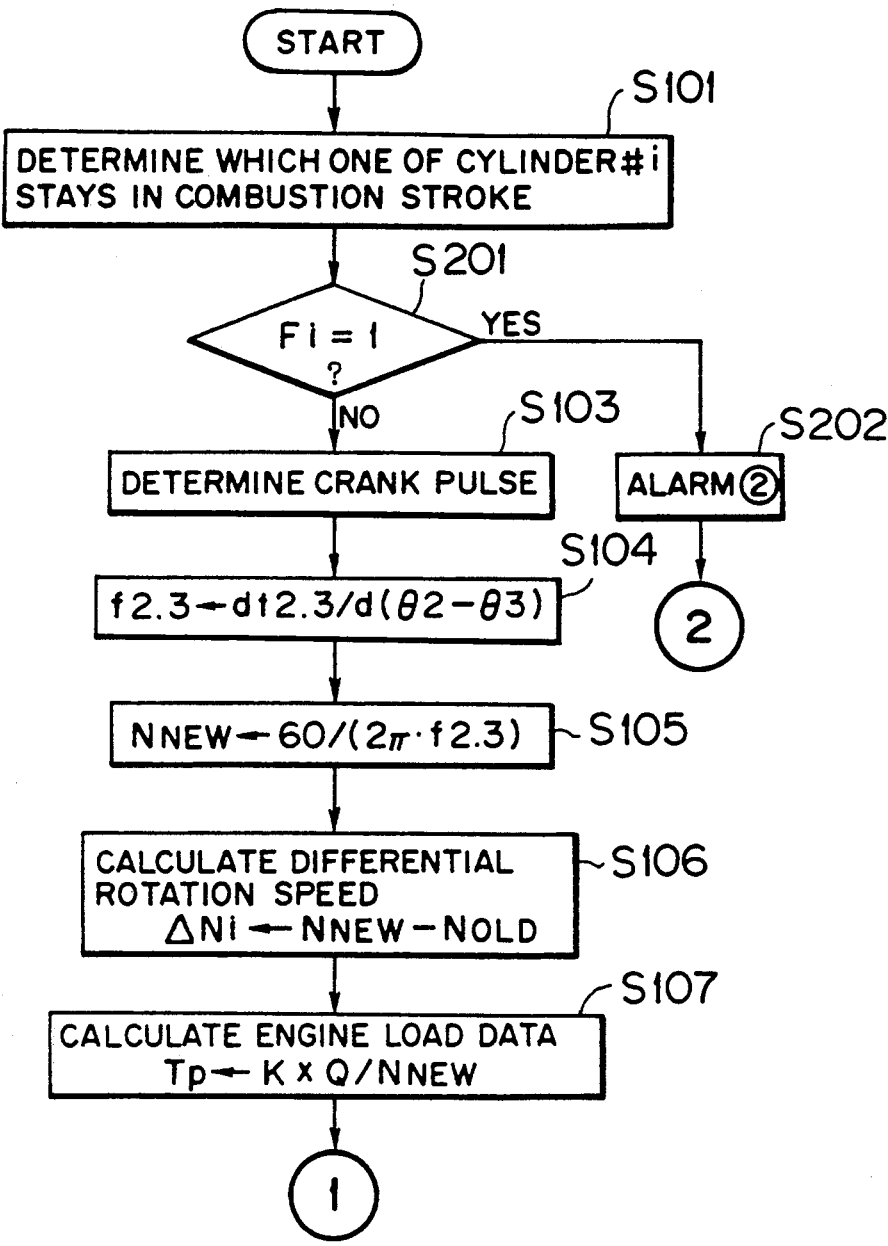
FIG. IIA

ENGINE MISFIRING DETERMINING DEVICE

BACKGROUND OF THE INVENTION

The present invention relates to an engine misfiring determining device for determining a misfiring state of each cylinder based on variation of engine momentum of the cylinder.

In general, the ideal combustion of a multi-cylinder engine keeps the same process at each cycle for the purpose of obtaining a stable output. The multi-cylinder engine, however, may be subject to vary in combustion because;

(1) An intake gas distribution factor is disproportioned by some factors such as a complicated form of an intake pipe and intake air interference between both cylinders, (2) The cylinders have respective combustion temperatures which are slightly different among them and are caused by respective coolant routes, (3) The cylinders are subject to variation in dimensions of some factors such as respective combustion chamber volumes and piston shapes, and (4) The cylinders are subject to slight variation in air fuel ratio, which variation results from the difference of a fuel injection caused by the manufacturing errors of injectors.

The so-called combustion variation has been traditionally reduced to a minimum by controlling the air/fuel ratio and ignition period of each cylinder. Recently, however, the automobiles have been using a high-performance engine which keeps higher output and fuel consumption lower. When degradation or failure occurs in some components such as an injector and an ignition plug, this type of engine may intermittently cause a misfire, thereby lowering the output.

A driver may often keep a car with the multi-cylinder engine driving even if one cylinder of the engine suffers from an intermittent misfiring. Moreover, the driver cannot understand if the misfiring is transiently caused or results from the degradation of an injector or an ignition plug.

For detecting how each cylinder is combusted while driving a car, a Japanese Patent Laid-open No. 61-258955 (1986) has proposed the method comprising the steps of comparing a difference between a maximum value and a minimum value of an engine rotation speed at the previous combustion stroke with that at the current combustion stroke, determining if the compared value is within a predetermined reference value for grasping how each cylinder is combusted, if the number of combustion abnormals reaches a predetermined value, determining that a misfiring occurs, and issuing an alarm to the driver.

This prior art, however, is designed to grasp the combustion variation of each cylinder based on the difference between a minimum engine rotation speed and a maximum engine rotation speed of a combustion-stroke cylinder. In actual, the rotation speed of the engine being combusted rises abruptly and the engine is subject to relatively large load, thereby varying an acceleration more. It results in being unable to specify a maximum value of an engine rotation number and lowering the degree of accuracy about determining when a misfiring occurs.

SUMMARY OF THE INVENTION

It is therefore an object of the present invention to provide an engine misfiring determining device which is capable of accurately detecting a misfiring.

In carrying out the object in a preferred mode, according to a first aspect of the invention, as shown in FIG. 1, the engine misfiring determining device comprises misfiring determining means for comparing the momentum at the interval where an engine does not work in the previous combustion with that in the current combustion, calculating the momentum variation of a combustion-stroke cylinder positioned between both intervals, comparing the momentum variation with a misfiring determining level, and determining the misfiring state of each cylinder, cylinder misfiring times counter for counting the number of frames of each cylinder determined by the misfiring determining means, cylinder average misfiring times calculating means for averaging the number of misfirings of the cylinder at each predetermined cycle of each cylinder, and cylinder abnormal misfiring determining means for comparing the cylinder average misfiring times calculated by said cylinder average misfiring times calculating means with a predetermined misfiring determination reference times for detecting an abnormal misfiring in each cylinder.

According to a second aspect of the present invention, as shown in FIG. 2, the engine misfiring determining device comprises misfiring determining means for comparing the momentum at the interval where an engine does not work in the previous combustion with that in the current combustion, calculating the momentum variation of a combustion-stroke cylinder positioned between both intervals, comparing the motion variation with a misfiring determining level, and determining the misfiring state of each cylinder, cylinder misfiring times counting means for counting the number of misfirings of each cylinder determined by the misfiring determining means, and cylinder maximum counting number storage means for comparing the misfiring times of each cylinder counted by said counting means with a predetermined maximum count times, if the misfiring times reach the maximum count times, fixed-storing the maximum count times.

The engine misfiring determining device takes the steps of counting the misfiring times of each cylinder, comparing the counted misfiring times with the predetermined count times, and if the misfiring times reach the maximum count times, fixed-storing the maximum count times.

In operation, the engine misfiring determining device designed according to the first aspect of the invention takes the steps of comparing the momentum at the interval where an engine does not work in the previous combustion with that in the current combustion, calculating the motion variation of a combustion stroke cylinder positioned between both intervals, comparing the momentum variation with the misfiring determining level, and determining the misfiring state of each cylinder.

The device takes the further steps of counting the misfiring times of each cylinder, averaging the misfiring times of each cylinder at each predetermined cycle, comparing the cylinder average misfiring times with the predetermined misfiring determination reference times, and detecting the abnormal misfiring in each cylinder based on the compared result.

The engine misfiring determining device designed according to the second aspect of the invention takes the steps of comparing the momentum at the interval where an engine does not work in the previous combustion with that in the current combustion, calculating the momentum variation of the combustion stroke cylinder positioned between both intervals, comparing the motion variation with the predetermined misfiring determining level, and determining the misfiring state in each cylinder.

BRIEF DESCRIPTION OF THE DRAWINGS

FIG. 11A and 11B are flowcharts illustrating a misfiring determining procedure;

DESCRIPTION OF PREFERRED EMBODIMENTS

Figure 3:
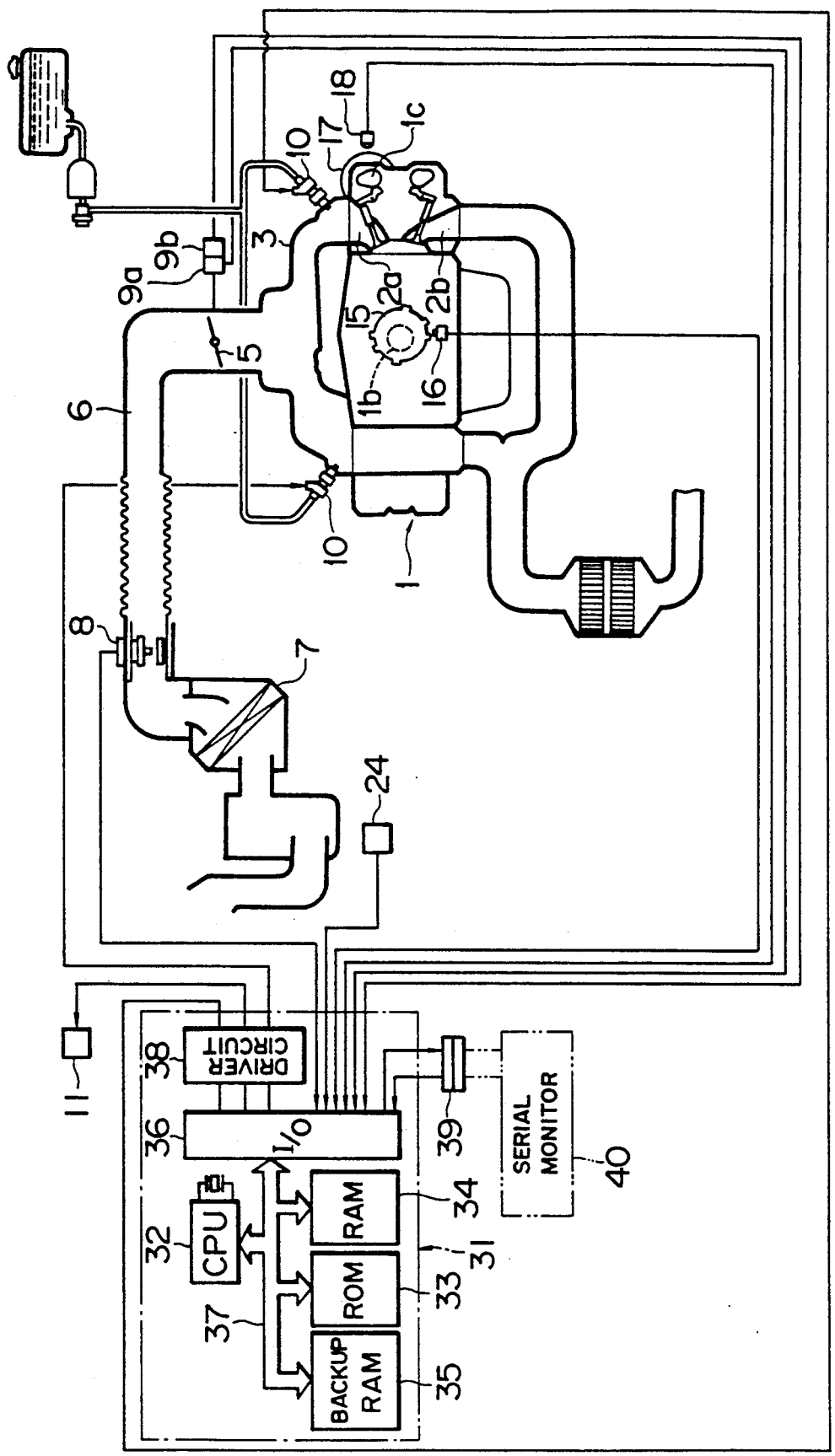
FIG. 3 is a schematic view showing an engine control system.

In FIG. 3, 1 denotes an engine. 4 denotes a four-cylinder horizontal opposed engine. The engine 1 has an intake port 2a, an intake pipe 6 and an intake manifold 3. The intake pipe 6 includes an intake air quantity sensor 8 and an air cleaner 7. The intake pipe 6 provides a throttle valve 5. The throttle valve 5 provides a throttle opening sensor 9a and an idle switch 9b for detecting a full closeness of a throttle valve 5. The intake manifold 3 has an (multi-point) injector 10.

The engine 1 has a crank shaft 1b to which a crank rotor 15 is fitted. On the outer peripheral surface of the crank rotor 15 is provided a crank angle sensor 16 consisting of an electromagnetic pickup for detecting a crank angle. A cam rotor 17 is fitted to a cam shaft 1c turning half with respect to the crank shaft 1b. On the outer peripheral surface of the cam rotor 17 is provided a cam sensor 18.

Figure 4:
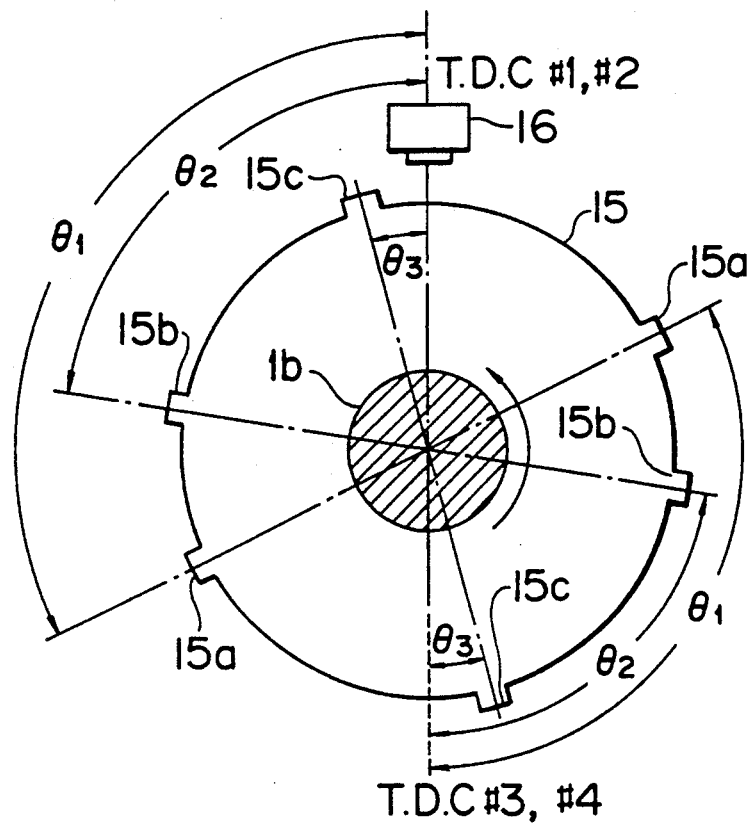
FIG. 4 is an elevation view showing a crank rotor and a cam angle sensor.

As shown in FIG. 4, on the outer peripheral surface of the crank rotor 15 is formed projections 15a, 15b, 15c. These projections 15a, 15b, 15c are respectively positioned at $\theta1$, $\theta2$, $\theta3$ before the top dead center (BTDC) of each cylinder. An engine rotation number N is calculated on the time passed from the projection 15b to 15c.

In general, while idling, the ignition time comes closer to BTDC20°. However, if the mixture is ignited at the crank angle, the combustion pressure does not abruptly rise until BTDC10°CA.

Figure 6:
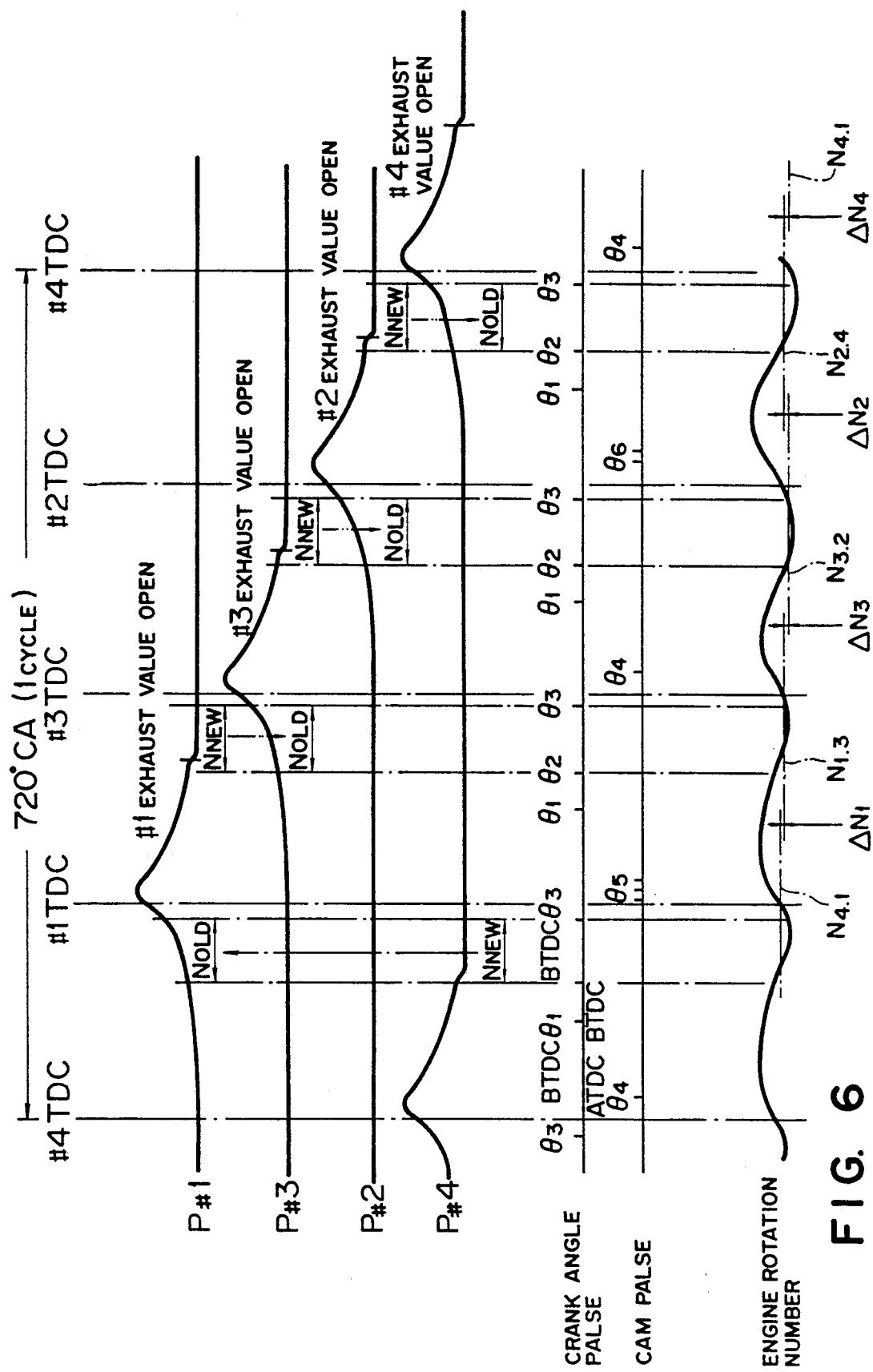
FIG. 6 is a time chart showing a pressure variation in the cylinder.

As shown in FIG. 6, the first embodiment is designed to set the opening time of an exhaust value of each cylinder toward the slightly retarding side of the ignition reference crank angle BTDC$\theta2$. In general, however, the combustion pressure exerted immediately after the opening of the exhaust valve lowers abruptly, resulting in the combustion pressure substantially raising no effect at the crank angle BTDC$\theta3$.

Setting the crank angle $\theta3$ of the projection 15c to the advancing side of BTDC10°CA, the interval between the crank angles BTDC$\theta2$, $\theta3$ of the projections 15b, 15c is hardly subject to the adverse effect raised by the combustion at an interval between both cylinders. That is, at the interval, no work is done by the combustion.

Figure 5:
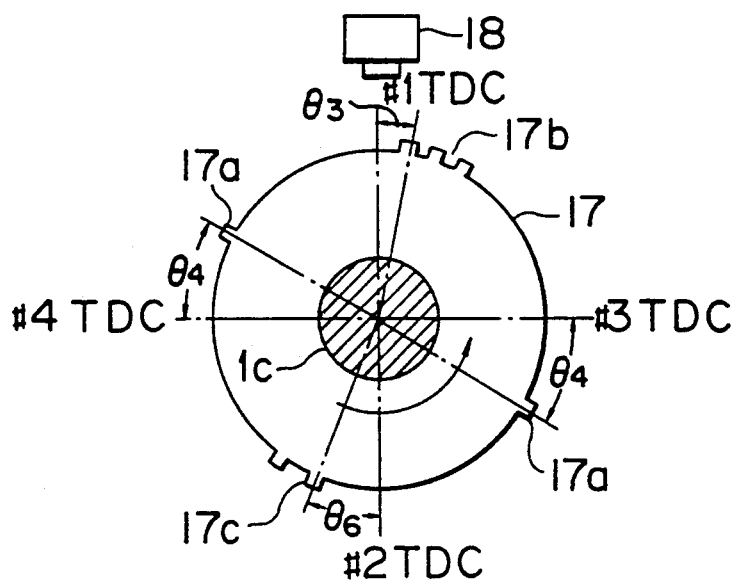
FIG. 5 is an elevation view showing a cam rotor and a cam angle sensor.

As shown in FIG. 5, on the outer peripheral surface of the cam rotor 17 are formed cylinder determination projections 17a, 17b, 17c. The projection 17a is positioned at $\theta4$ after the top dead center (ATDC) of the cylinders #3, #4. The projection 17b comprises three projections, the first of which is positioned at $\theta5$ after the top dead center (ATDC) of the cylinder #1. The projection 17c comprises two projections, the first of which is positioned at $\theta6$ after the top dead center (ATDC) of the cylinder #2.

The embodiment shown in FIG. 5 is arranged so that $\theta1=97°$CA, $\theta2=65°$CA, $\theta3=10°$CA, $\theta4=20°$CA, $\theta5=5°$CA, $\theta6=20°$CA, and $\theta(2-3)=55°$CA. Under this arrangement, as shown in FIG. 6, if the cam angle sensor 18 detects a cam pulse at $\theta5$ (projection 17b), the crank pulse detected by the crank angle sensor 16 afterward is determined to be a signal indicating the crank angle of the cylinder #3.

If the cam angle sensor 18 detects a cam pulse at $\theta4$ (projection 17a), the crank pulse detected by the crank angle sensor 16 afterward is determined to be a signal indicating the crank angle of the cylinder #2. Likewise, the crank pulse detected by the crank angle sensor 16 after the cam pulse is detected at $\theta6$ (projection 17c) is determined to be a signal indicating the cam pulse of $\theta4$ (projection 17a). If the cam pulse is detected at $\theta4$ (projection 17a) after the cam pulse at $\theta6$, the crank pulse detected by the crank angle sensor 16 afterward is determined to be a signal indicating the crank angle of the cylinder #1.

After the cam angle sensor 18 detects a cam pulse, the crank pulse is detected by the crank angle sensor 16. The crank pulse is determined to be a reference crank angle $\theta1$ of the cylinder.

In addition, in FIG. 3, 24 denotes a vehicle speed sensor.

Circuit Arrangement of Control Device

In FIG. 3, 31 denotes a control device consisting of a microcomputer, in which a CPU (Central Processing Unit) 32, a ROM 33, a RAM 34, a backup RAM 35 and an I/O interface 36 are connected through a bus line 37. The input port of the I/O interface 36 is connected to sensors 8, 9a, 16, 18, 24 and an idle switch 9b. The output port is connected to the injector 10 through a driving circuit 38 and to alarming means 11 such as an indicator lamp located on an instrument panel (not shown).

The ROM 33 stores a control program and a fixed data. The fixed data contains a misfiring determination level map MP ΔN LEVEL (to be described later).

The RAM 34 stores the processed output signals of the sensors and the data processed by the CPU 32. The backup RAM 35 stores trouble data such as each cylinder misfiring determination data.

The output port of the I/O interface 36 is connected to a diagnosis connector 39. By connecting the diagnosis connector 39 to a diagnosis serial monitor 40, the trouble data stored in the backup RAM 35 is read out.

The CPU 32 operates a fuel injection pulse width or an ignition time for the injector 10 based on various kinds of data stored in the RAM 34 in accordance with the control program stored in the ROM 33.

Function Arrangement of Control Device 31

Figure 1:
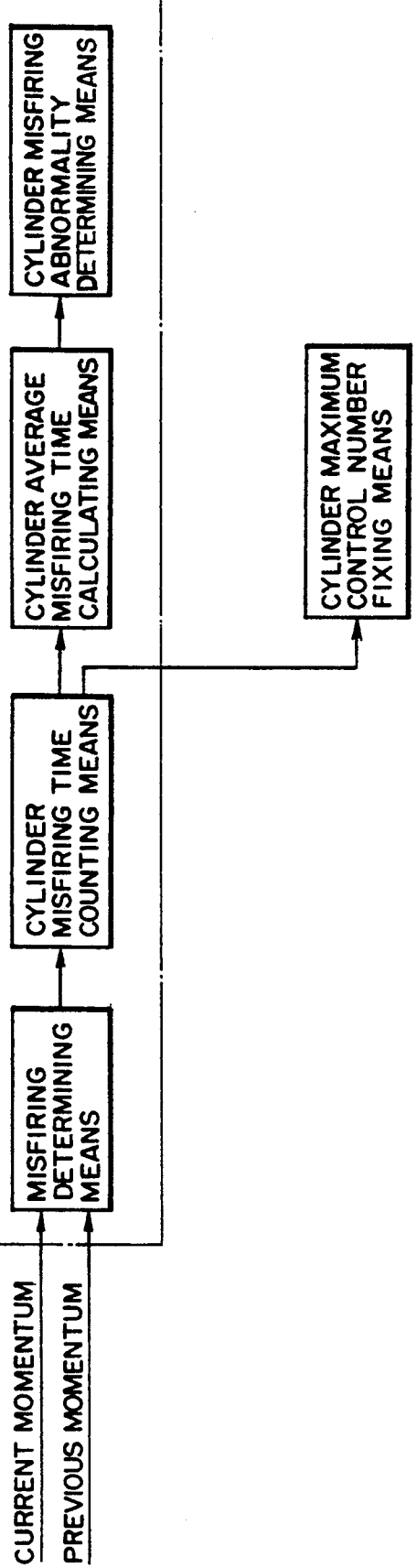
FIG. 1 is a block diagram conceptually according to the present invention.
Figure 2:
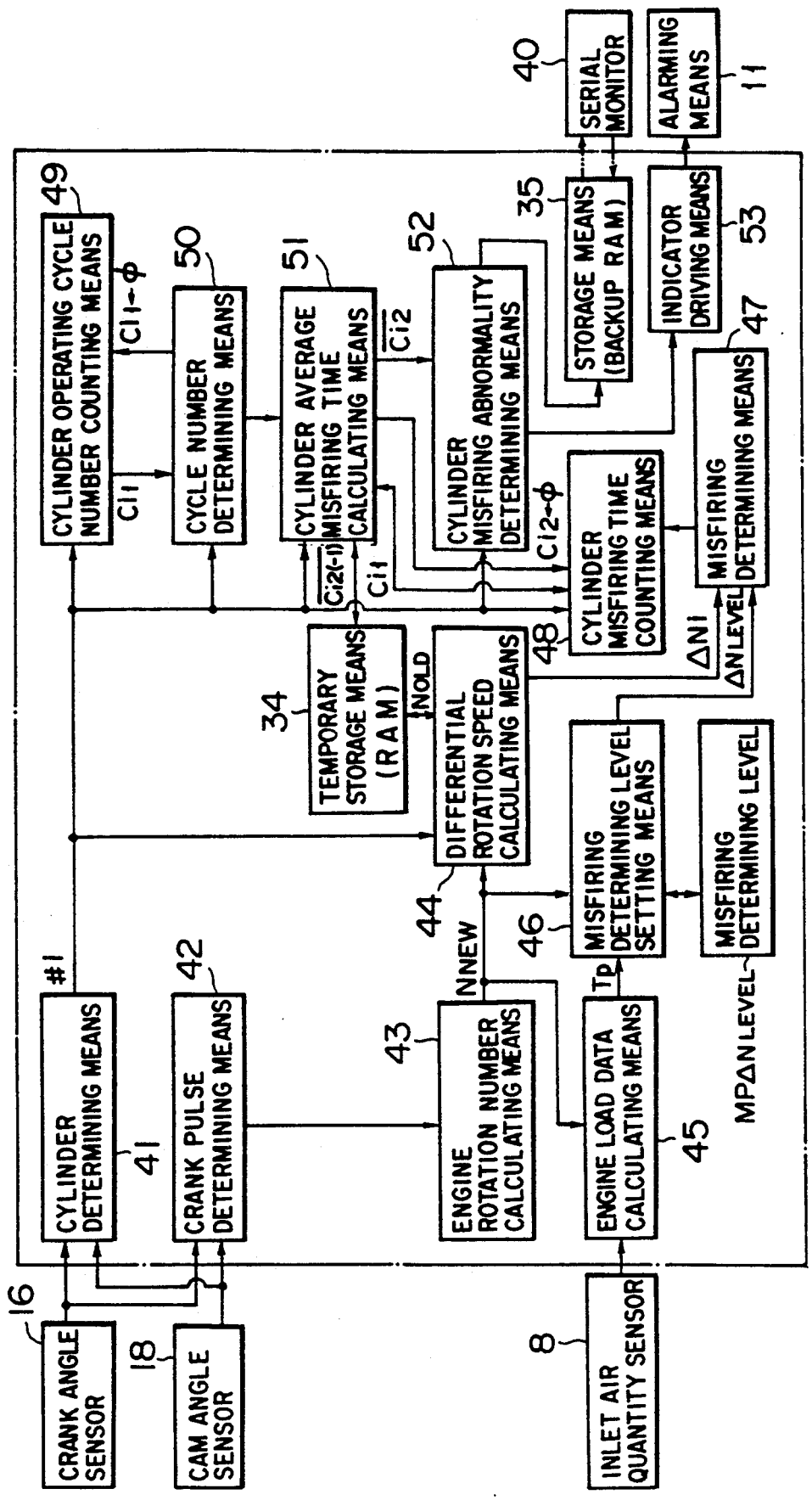
FIG. 2 is a block diagram showing a control device of a first embodiment of the present invention.

As shown in FIG. 2, the function arrangement about the misfiring determination of the control device 31 comprises cylinder determining means 41, crank pulse determining means 42, an engine rotation number calculating means 43, differential rotation speed calculating means 44, engine load data operating means 45, misfiring determining level setting means 46, misfiring determining means 47, cylinder misfiring time counting means 48, cylinder operating cycle number counting means 49, cycle number determining means 50, cylinder average misfiring time calculating means 51, cylinder abnormal misfiring determining means 52, and indicator driving means 53.

The cylinder determining means 41 serves to determine the combustion stroke cylinder #i (i=1, 3, 2, 4) based on the cam pulse detected by the cam angle sensor 18 at the projections 17a to 17c of the cam rotor 17. The function of the cylinder determining means 41 corresponds to a step S101 shown in FIG. 9.

The crank pulse determining means 42 serves to determine which one of the projections 15a to 15c matches to the crank pulse output by the crank angle sensor 16 after the cam pulse output by the cam angle sensor 18. The function of the crank pulse determining means 42 corresponds to a step S103 in FIG. 9.

The engine rotation number calculating means 43 serves to calculate an engine rotation number N NEW at the interval where no combustion work is done, based on the time when the crank moves from $\theta 2$ (projection 15b) to $\theta 3$ (projection 15c).

The differential rotation speed calculating means 44 serves to calculate a differential rotation speed $\Delta Ni$ (i=1, 3, 2, 4) of the cylinder #1 determined by the cylinder determining means 41, based on a difference between the current engine rotation number N NEW calculated by the engine rotation number calculating means 43 and the previous engine rotation number N OLD.

As shown in FIG. 6, in case of the four-cycle four-cylinder engine, the engine rotation number N NEW operated at the interval where there is no combustion work is calculated at each 180°CA. For example, considering the cylinder #1, the differential rotation speed $\Delta N1$ of the cylinder #1 can be obtained by subtracting the previous engine rotation number N OLD from the current engine rotation number N NEW. For the cylinder #3, the differential rotation speed $\Delta N3$ of the cylinder #3 can be obtained from the engine rotation number N NEW of the cylinder #3, assuming that the engine rotation number N NEW of the cylinder #1 is considered as N OLD.

Assuming that each engine rotation number common to the adjacent cylinders is set as N4.1, N1.3, N3.2 and N2.4, the differential rotation speed of each cylinder is calculated as follows.

$\Delta Ni = N\ New - N\ OLD$
$\Delta N1 = N1.3 - N4.1$
$\Delta N3 = N3.2 - N1.3$
$\Delta N2 = N2.4 - N3.2$
$\Delta N4 = N4.1 - N2.4$ It is obvious that the differential rotation speed $\Delta Ni$ has strong correlation with an average effective pressure shown in FIG. 6, that is, the combusting state of each cylinder. Hence, by obtaining the differential rotation speed $\Delta Ni$, it is presumed what combusting state each cylinder #1 stays at (the average effective pressure shown in FIG. 6).

Next, the description will be directed to the relation between the differential rotation speed $\Delta Ni$ and the average effective pressure.

First, the engine-rotating state can be represented by the equation;

$$I \cdot 2\pi/60 \cdot dN/DT = Ti - Tf \qquad (1)$$

where I denotes inertia moment, N denotes an engine rotation speed, Ti denotes indication torque and Tf denotes friction torque.

Then, the equation (1) can be simplified to be;

$$dn/dt \propto Ti - Tf \qquad (2)$$

Then, by replacing the torque with the pressure, the equation (2) can be represented to be;

$$dN/dt \propto Pi - Pf \qquad (3)$$

where Pi denotes an average effective pressure and Pf denotes a friction loss effective pressure.

In an experiment, the value of dN/dt of the equation (3) was obtained on the differential rotation speed $\Delta Ni$ and the time change $\Delta T$ (180°CA) if the crank angle width $\theta 2.3$ used for detecting the rotation speed is set as about a combustion stroke in the four-cycle four-cylinder engine. The experiment proved that the value of dN/dt has strong correlation with Pi−Pf.

In this case, it may be considered that the variation of $\theta T$ (180°CA) is negligible and the friction loss effective pressure Pf is constant. Hence, from the equation (3), the following equation can be obtained.

$$\Delta N = K \times Pi + Pf \qquad (4)$$

where Pi and Pf are constants.

Hence, by obtaining the differential rotation speed $\Delta N$ of each cylinder, the average effective pressure Pi, that is, the combusting state of each cylinder can be presumed.

As the differential rotation speed $\Delta Ni$ of each cylinder #i comes closer to "0", each cylinder may have the uniform combusting state.

On the other hand, assuming that the friction average effective pressure is set as a constant C and a proportional constant is K, the equation (3) can be transformed to;

$$dN/dt = K \propto Pi - C \qquad (5)$$

Hence, by obtaining K and C, it is possible to obtain the average effective pressure Pi.

According to the equation (5), by differentiating the differential rotation speed $\Delta N$ with respect to time, it is possible to presume the average effective pressure Pi from the differential rotation speed $\Delta N$ more accurately.

The engine load data operating means 45 serves to set engine load data (=fundamental fuel injection pulse width) Tp based on the inlet air quantity Q measured by the inlet air quantity sensor 8 and the engine rotation number N NEW.

The misfiring determining level setting means 46 serves to set the misfiring determining level $\Delta N$ LEVEL from the misfiring determining level map MP$\Delta N$ LEVEL with the parameters of the engine rotation number N NEW.

Figure 7:
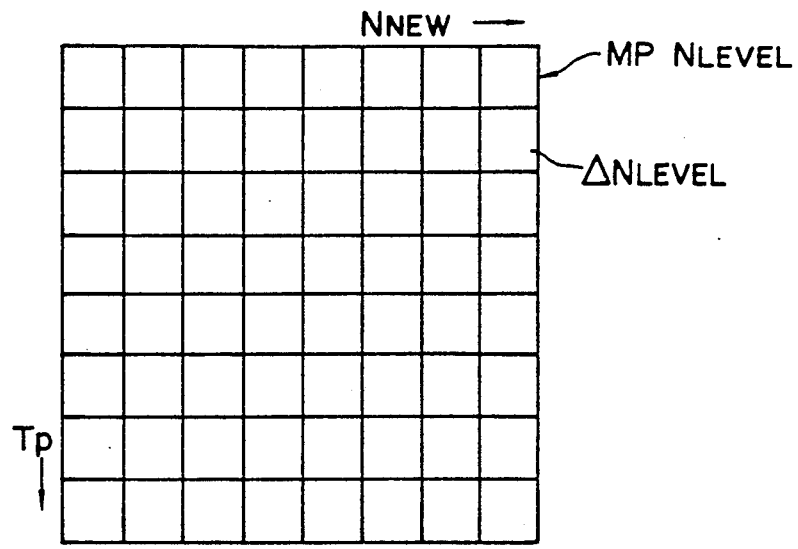
FIG. 7 is a conceptual view showing a misfiring determining level map.

As shown in FIG. 7, the misfiring determining level map MP$\Delta N$ LEVEL is a three-dimensional map having parameters of the engine rotation number N NEW and the engine load data Tp. Each area enclosed by the lattice stores the misfiring determining level $\Delta N$ LEVEL obtained by an experiment or the like.

Figure 8:
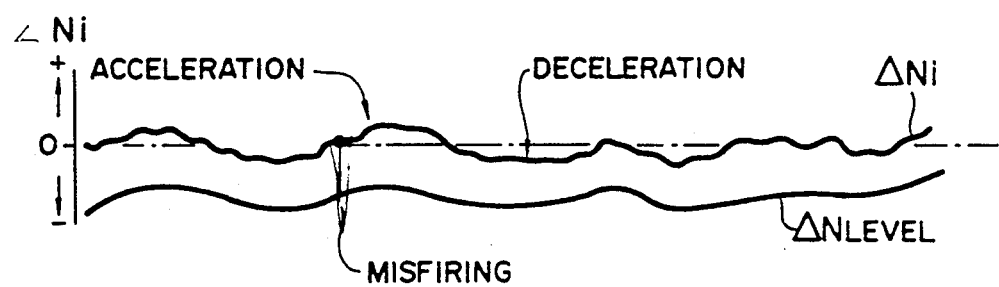
FIG. 8 is a time chart showing a differential rotation speed and a misfiring determining level.

As shown in FIG. 8, the differential rotation speed $\Delta Ni$ temporarily rises. This variation is dependent on the driving condition of the engine. The variation can be obtained at each driving condition by the experiment and the misfiring determining level $\Delta N$ LEVEL is set according to the variation and represented as a map format for obtaining high misfiring determining accuracy.

The misfiring determining means 47 serves to compare the differential rotation speed $\Delta Ni$ of the cylinder #i in the combustion stroke with the misfiring determining level $\Delta N$ LEVEL and determine if a misfiring occurs in the cylinder #i in the combustion stroke.

The cylinder misfiring time counting means 48 serves to count the time Ci2 (number) of the misfirings caused in the combustion.

The cycle number determining means 50 serves to compare the operating cycle number Ci1 of the cylinder #i in the combustion stroke, the operating cycle number of which was counted by the cylinder operating cycle number counting means 49, with a predetermined sampling cycle number Ci1SET and determine if the operating cycle number Ci1 of the cylinder #i reaches the sampling cycle number Ci1SET.

The cylinder average misfiring calculating means 51 serves to calculate the current average misfiring time $\overline{Ci2}$ from the misfiring time Ci2 counted during the operating cycle Ci1 of the cylinder #i having the operating cycle reached to the sampling cycle number and the average misfiring time $\overline{Ci2(-1)}$.

The cylinder abnormal misfiring determining means 52 serves to compare the average misfiring time $\overline{Ci2}$ with a predetermined misfiring determining reference time $\overline{Ci2SET}$, if the average misfiring time $\overline{Ci2}$ reaches the misfiring determining reference time $\overline{Ci2SET}$, store the abnormal misfiring data of the cylinder #i in the storage means (backup RAM) 35, and output a driving signal to the alarming means 11 such as an indicator lamp through the driving means 53.

The abnormal misfiring data of the cylinder #i stored in the storage means (backup RAM) 35 can be read out at a proper place like the service station run by a dealer if the serial monitor 40 is connected to the control device. At a time, the abnormal misfiring data can be cleared out of the storage means 35 through the serial monitor 40.

Figure 9A:
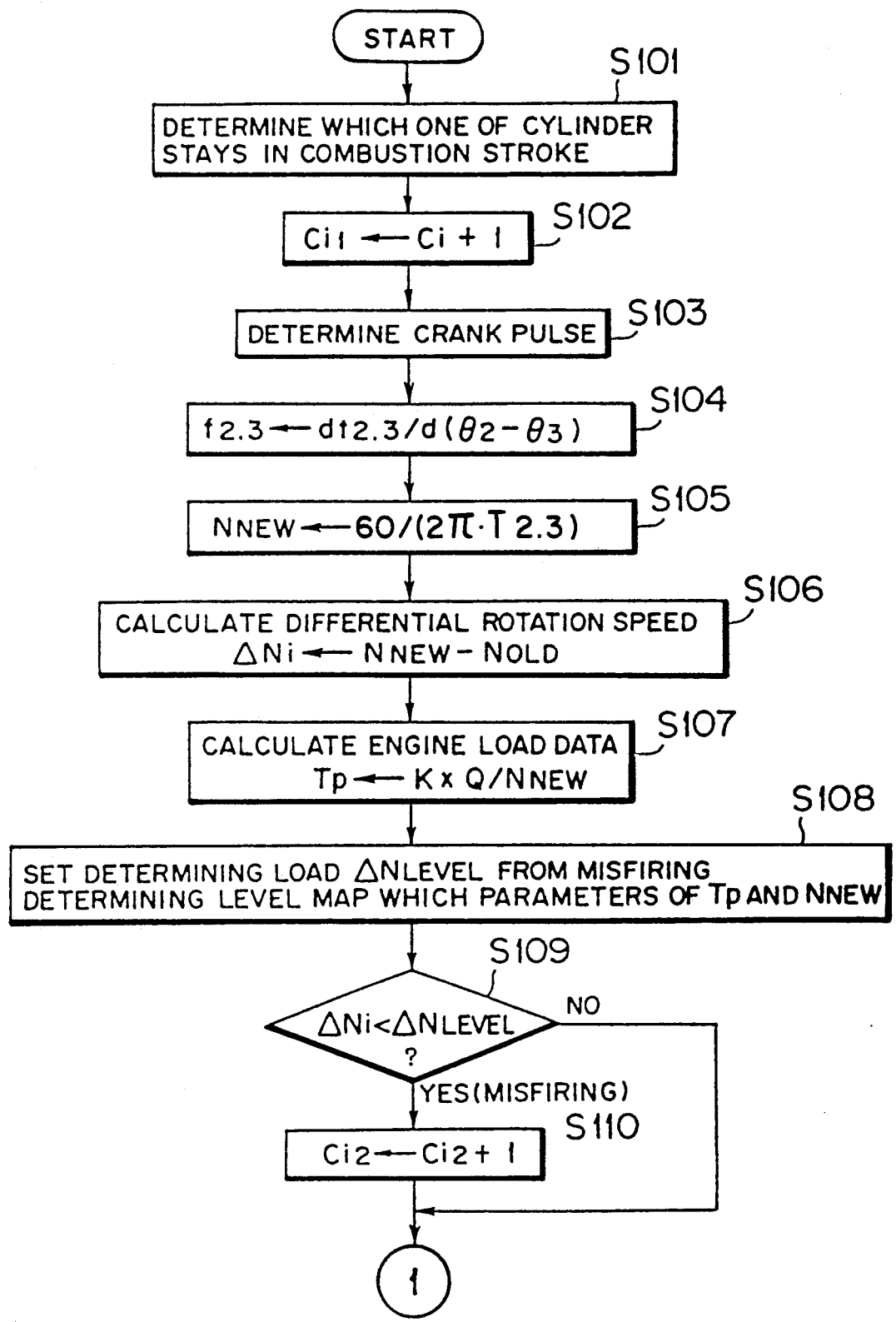
FIG. 9A and 9B are flowcharts illustrating a misfiring determining procedure.
Figure 9B:
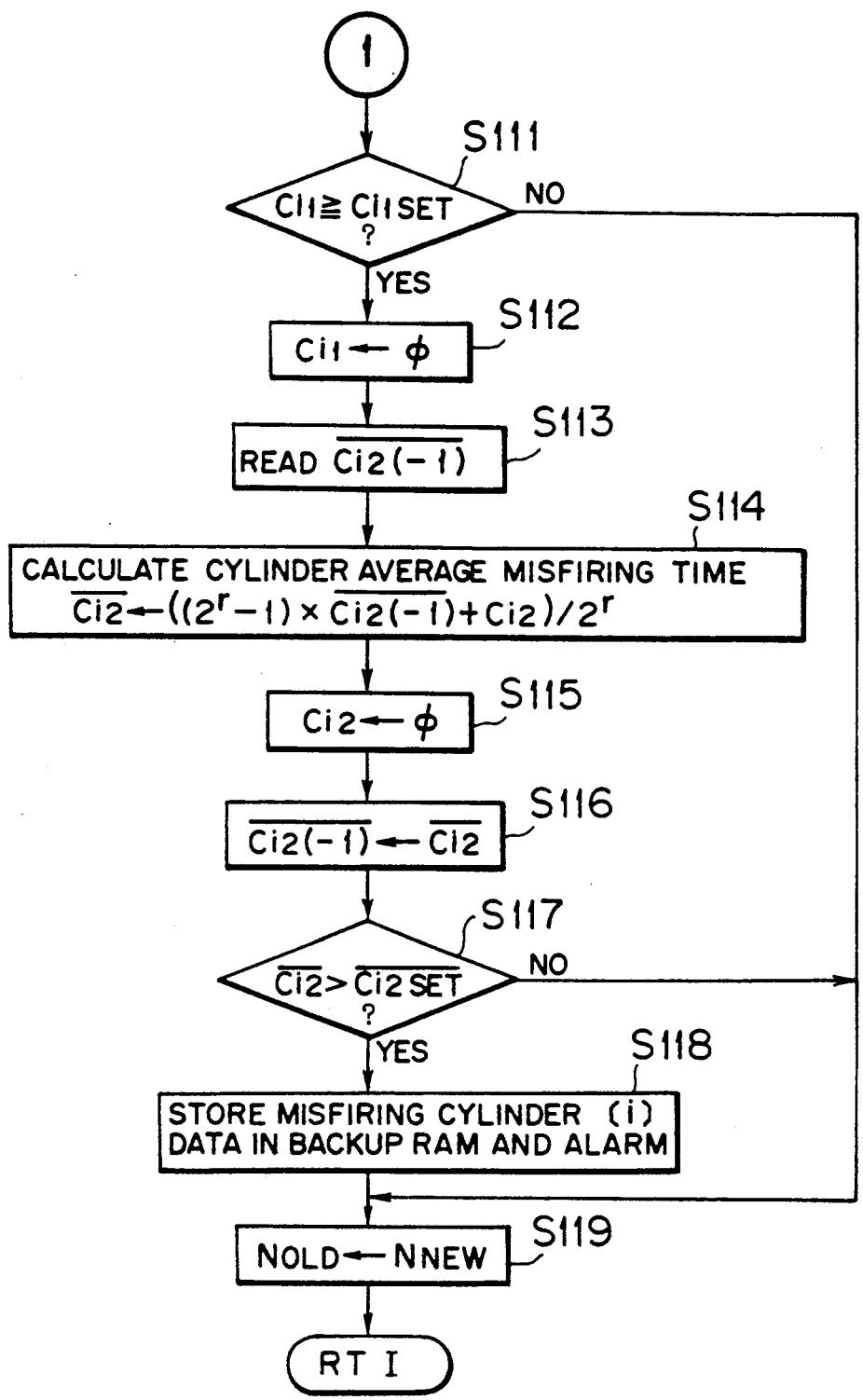

Next, the description will be directed to a misfiring determining procedure designed according to the foregoing embodiment with reference to the flowchart shown in FIG. 9. The control program is executed for each cylinder in synchronization with the rotation number.

At first, at a step S101, the control program determines which one of the cylinders #i (i=1, 3, 2, 4) stays in the combustion stroke based on the crank pulse output by the crank angle sensor 16 and the cam pulse output by the cam angle sensor 18. Then, at a step S102, the operating cycle number Ci1 of the cylinder #i in the combustion stroke is counted (Ci1←Ci1+1).

Next, at a step S103, the control program determines the crank pulse detected at the BTDC $\theta 2$, $\theta 3$ output by the crank angle sensor 16 by interrupting the cam pulse. At a step S104, based on the time taken between the crank pulses of BTDC $\theta 2$ and $\theta 3$ and a fan angle ($\theta 2 - \theta 3$) formed between $\theta 2$ and $\theta 3$, the period f2, 3 can be calculated (f2, 3←dt2, 3/d ($\theta 2 - \theta 3$)).

At a step S105, the control program calculates the current engine rotation number N NEW based on the period f2, 3 (N NEW←60/(2π·f2, 3)). Then, at a step S106, based on the difference between the current engine rotation number N NEW and the engine rotation number N OLD of the cylinder #i calculated at the previous routine, the control program serves to calculate the differential rotation speed $\Delta Ni$ of the interval ($\theta 2 - \theta 3$) where no combustion work is done ($\Delta Ni$←N NEW−N OLD).

The engine rotation number N NEW calculated at the interval ($\theta 2 - \theta 3$) where no combustion work is done indicates a relatively stable value, because it does not contain a combustion-pressure-based variation factor adversely effecting on the rotation number. Moreover, the two engine rotation numbers N NEW, N OLD to be compared therewith are detected under the same condition, so that the differential rotation speed $\Delta Ni$ has the definitive correlation with the combusting state of the combustion-stroke cylinder #i. Therefore, the combustion state is presumed very accurately.

Then, at a step S107, the control program calculates the engine load data (=fundamental combustion injecting pulse width) Tp based on the engine rotation number N NEW and the inlet air quantity Q obtained at the current routine (Tp←K×Q/N NEW K: constant).

At a step S108, the control program sets the misfiring determining level $\Delta N$ LEVEL from the misfiring determining level map MP $\Delta N$ LEVEL with the parameters of the engine load data Tp and the engine rotation number N NEW. Then, at a step S109, the differential rotation speed $\Delta Ni$ is compared with the misfiring determining level $\Delta N$ LEVEL.

The misfiring determining level $\Delta N$ LEVEL can be properly varied according to the driving condition with the map being retrieved so that it can keep relatively high accuracy.

At a step S109, if $\Delta Ni < \Delta N$ level, that is, the differential rotation speed $\Delta Ni$ of the cylinder #i in the combustion stroke is determined to be lower than the misfiring determining level $\Delta N$ LEVEL (see FIG. 9), the control program determines that the misfiring occurs and goes to a step S110. If $\Delta Ni \geq \Delta N$ LEVEL, the program determines that the cylinder #i stays in the normal combustion and goes to a step S111.

Proceeding to the step S110 when the program determines the misfiring has occurred, the misfiring time Ci2 of the combustion-stroke cylinder #1 is counted (Ci2 ←Ci2+1), and the process goes to the step S111.

At the step S111, the operating cycle number Ci1 of the combustion-stroke cylinder #i is compared with the predetermined sampling cycle number Ci1SET (for example, 100 cycles). If the operating cycle number Ci1 does not reach the predetermined cycle number Ci1-

SET ($Ci1 < Ci1SET$), the process jumps over to a step S119. If the operating cycle number $Ci1$ reaches the sampling cycle number $Ci1SET$ ($Ci1 \geq Ci1SET$), the process goes to a step S112 at which the operating cycle number $Ci1$ is reset ($Ci1 \leftarrow \phi$).

Proceeding to a step S113, the program reads out the average misfiring time $\overline{Ci2(-1)}$ of the combustion-stroke cylinder #i computed at the previous sampling period. At a step S114, the current cylinder average misfiring time $\overline{Ci2}$ is obtained from a weighted means of a summation coefficient r on the basis of the cylinder average misfiring time $\overline{Ci2(-1)}$ and the cylinder misfiring time $Ci2$ counted on the current sampling cycle number $Ci1SET$ ($\overline{ci2} \leftarrow ((2^4-1) \times \overline{Ci2(-1)} + Ci2)/2^r$).

Since the cylinder average misfiring time $\overline{Ci2}$ is obtained from the weighted means, it is possible to avoid a determination error about the misfiring of the combustion-stroke cylinder #i and temporary misfiring determination resulting from abrupt combusting variation.

Then, at a step S115, the cylinder misfiring time $Ci2$ is reset ($Ci2 \leftarrow \phi$). And, at a step S116, the cylinder average misfiring time $\overline{Ci2(-1)}$ calculated on the previous sampling period at the step S116 is updated with the current cylinder average misfiring time $\overline{Ci2}$ ($\overline{Ci2(-1)} \leftarrow \overline{Ci2}$).

At a step S117, the current cylinder average misfiring time $\overline{Ci2}$ is compared with the predetermined abnormal occurrence of misfiring determination reference time $\overline{Ci2SET}$. If $\overline{Ci2} > Ci2SET$, that is, the cylinder average misfiring time $\overline{Ci2}$ is greater than the abnormal occurrence of misfiring determination reference time $Ci2SET$, the program determines that the abnormal misfiring has occurred in the cylinder #i and goes to a step S118. At the step S118, the abnormal misfiring data in the cylinder #i is stored at the predetermined address of the backup RAM 35 and the indicator lamp is lit for giving an alarm about the abnormal misfiring to the driver. Then, the process goes to a step S119. If $\overline{Ci2} \leq \overline{Ci2SET}$, the program determines that the abnormal misfiring has not occurred in the cylinder #i and goes to the step S119.

Second Embodiment

Figure 10:
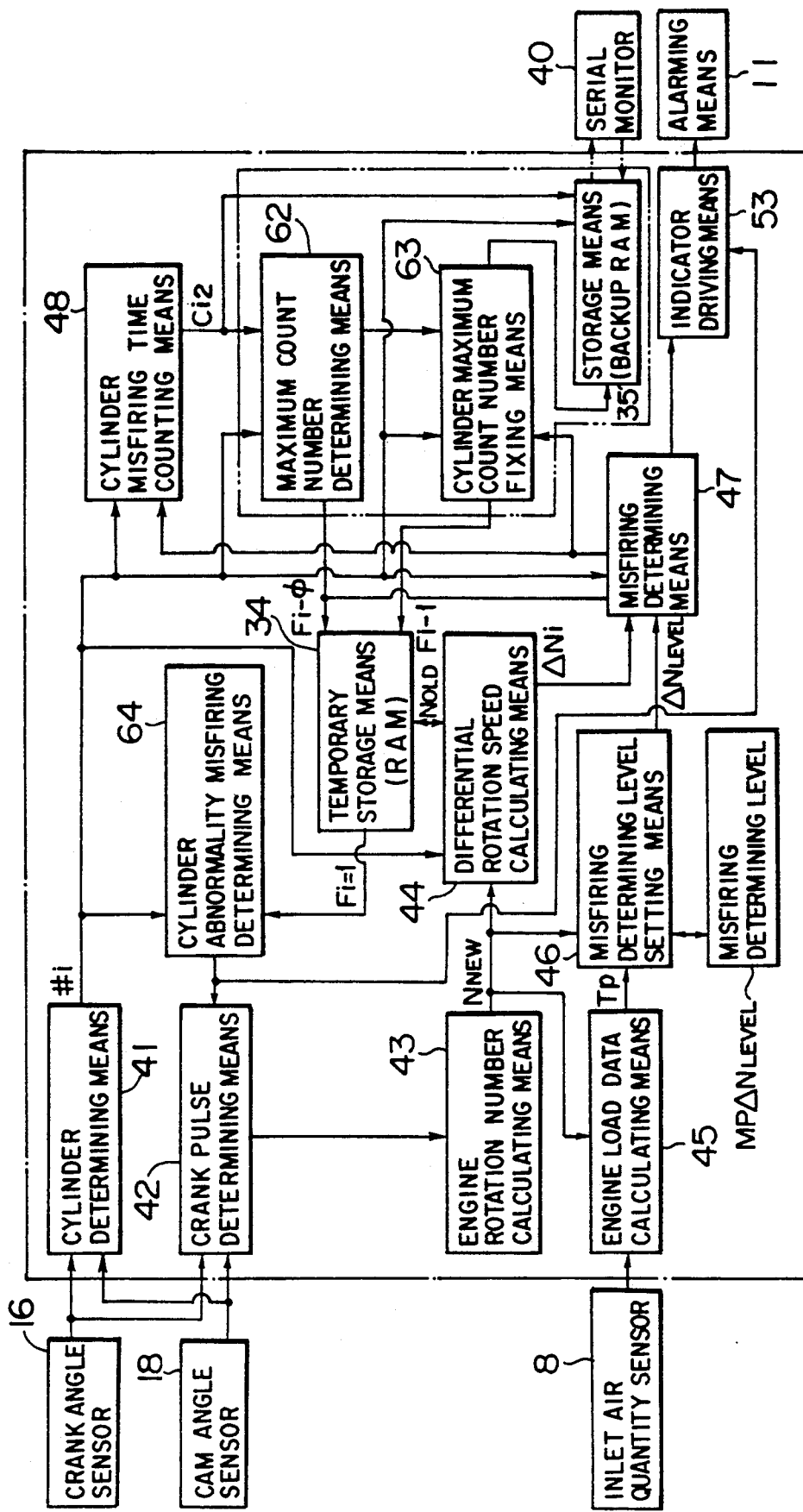
FIG. 10 is a block diagram showing a control device of a second embodiment of the present invention.
Figure 11B:
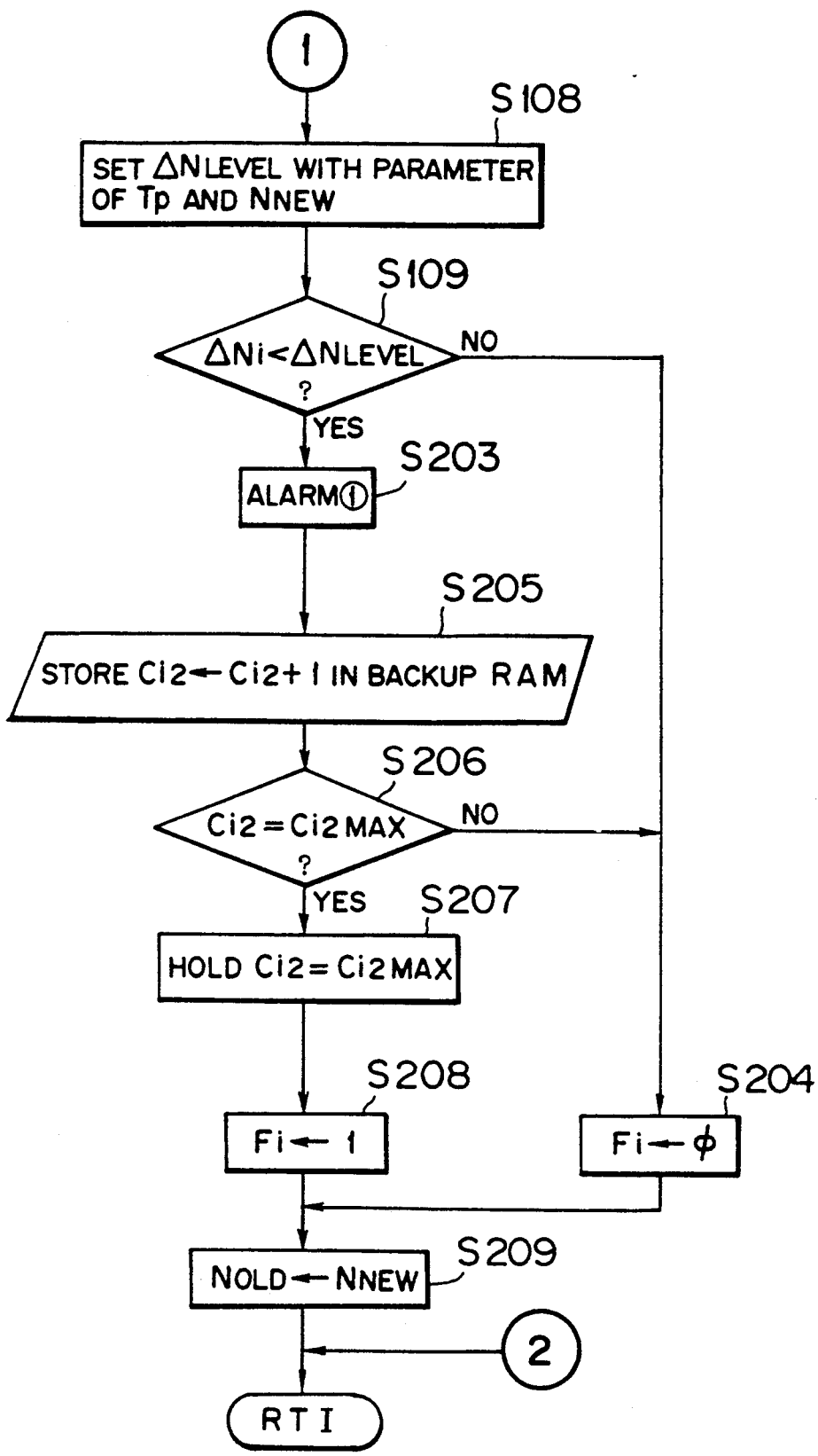

FIGS. 10 and 11 illustrate the second embodiment of the invention. FIG. 10 is a block diagram showing a control device. FIG. 11 is a flowchart showing a misfiring determining procedure.

The description is left out about the means and steps having the same functions as those described in the first embodiment.

The second embodiment is designed to sequentially store a misfiring time in each cylinder and fixed-store a maximum misfiring time if the misfiring time reaches a maximum count number.

The misfiring determining means 47 of the control device 31 has a function of outputting a driving signal to the alarming means 11 through the indicator driving means 53 if it is determined that the misfiring has occurred in addition to the function described with respect to the first embodiment.

In addition to the function described with respect to the first embodiment, the cylinder misfiring time counting means 48 has a function of updating the misfiring time $Ci2$ of the combustion-stroke cylinder #i stored at the predetermined address of the storage means (backup RAM) 35 with a value counted up each time the misfiring is detected.

61 denotes a cylinder maximum count number fixed-storing means consisting of a maximum count number determining means 62 and a cylinder maximum count number fixing means 63.

The maximum count number determining means 62 serves to compare the misfiring time $Ci2$ of the combustion-stroke cylinder #i counted at the cylinder misfiring time counting means 48 with the predetermined maximum count number $Ci2MAX$ (for example, 2 bytes (FFFFH)) and determine if the misfiring time $Ci2$ of the cylinder #i reaches the maximum count number $Ci2MAX$.

The cylinder maximum count number fixing means 63 as the maximum count number $Ci2MAX$ in the storage means (backup RAM) 35 if the misfiring time $Ci2$ of the combustion-stroke cylinder #i reaches the maximum count number $Ci2MAX$.

The cylinder misfiring abnormality determining means 64 serves to output an operation-stopping signal to the crank pulse determining means 42 and a driving signal to the alarming means 11 through the indicator driving means 53.

The misfiring time $Ci2$ of each cylinder stored in the storage means 35 can be read out if a serial monitor is connected to the control device. At this time, the misfiring time data can be cleared through the serial monitor.

The description will be directed to the misfiring determining means of the second embodiment with reference to the flowchart.

At a step S101, the program determines which one of the cylinders #i stays in the combustion stroke. Then, at a step S201, the program determines if a misfiring maximum count number flag $Fi$ of the combustion-stroke cylinder #i is set ($Fi=1$) or reset ($Fi=\theta$). If it is set ($Fi=1$), the process goes to a step S202 at which an indicator lamp is lit for alarming the abnormal misfiring to the drive and escapes out of the program.

On the other hand, if the program determines that the misfiring maximum count number flag $Fi$ is reset ($Fi=\phi$), the later procedure of steps S103 to S109 follows that described with respect to the first embodiment.

And, if at a step S109, the program determines that the misfiring has occurred in the combustion-stroke cylinder #i ($\Delta Ni < \Delta N$ LEVEL), the process goes to a step S203. If the program determines that the cylinder stays in the normal combustion ($\Delta Ni \geq \Delta N$ LEVEL), the process goes to a step S204 at which the misfiring maximum count number flag $Fi$ is reset ($Fi \leftarrow \phi$).

Proceeding to the step S203, the program serves to light the indicator lamp for a short time so that the driver can know that the misfiring has occurred.

The driver can grasp how the misfiring occurs in an engine, that is, the driving condition of the engine in which the misfiring is liable to occur by recognizing how frequently the indicator lamp is lit.

At a step S205, the misfiring time $Ci2$ of the cylinder #i is counted up ($Ci2 \leftarrow Ci2+1$) and then the resulting value $Ci2$ is stored at the predetermined address of the storage means (backup RAM).

By connecting the serial monitor 40 to the control device at the service station run by a dealer, it is possible to read out the misfiring time data for each cylinder stored in the storage means 35 and grasp the misfiring condition by referencing the manual.

Then, at a step S206, the misfiring time $Ci2$ of the cylinder #i is compared with the maximum count number $Ci2MAX$. If $Ci2 \times Ci2MAX$, the process goes to a step S207. If Ci2<Ci2MAX, the process goes to a step S204.

Proceeding to the step S207 as a result of determining that the misfiring time Ci2 reaches the maximum count number Ci2MAX (Ci2=Ci2MAX), the program holds the misfiring time Ci2 stored at the predetermined address of the storage means 35 as the maximum count number Ci2MAX. At a step S208, the misfiring maximum count number flag Fi is set (Fi←1).

Proceeding to the step S208 or from the step S204 to S209, the program updates the previous engine rotation number N OLD with the current engine rotation number N NEW (N OLD N NEW) and escapes out of the program.

Third Embodiment

Figure 12:
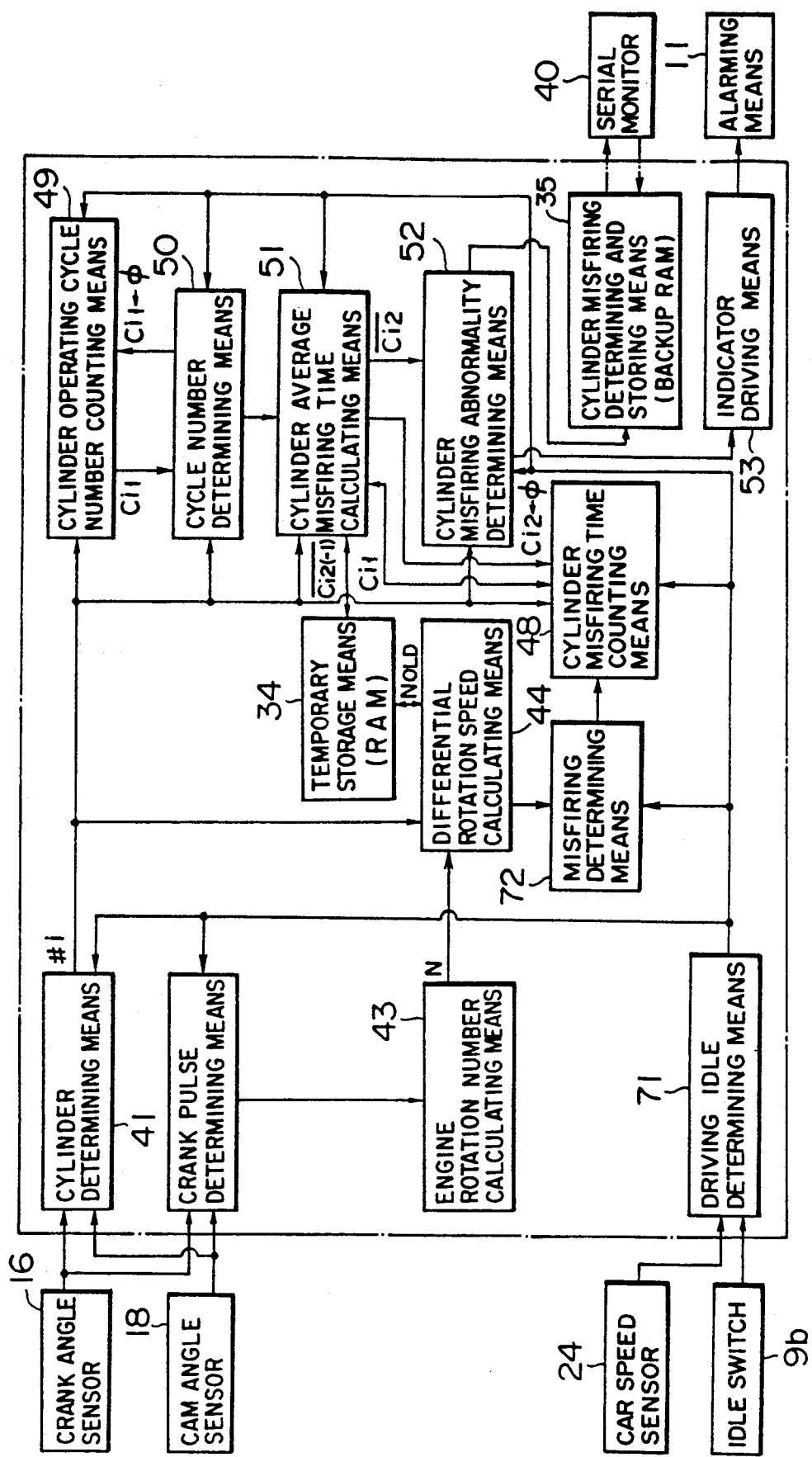
FIG. 12 is a block diagram showing a control device of a third embodiment of the present invention.
Figure 13A:
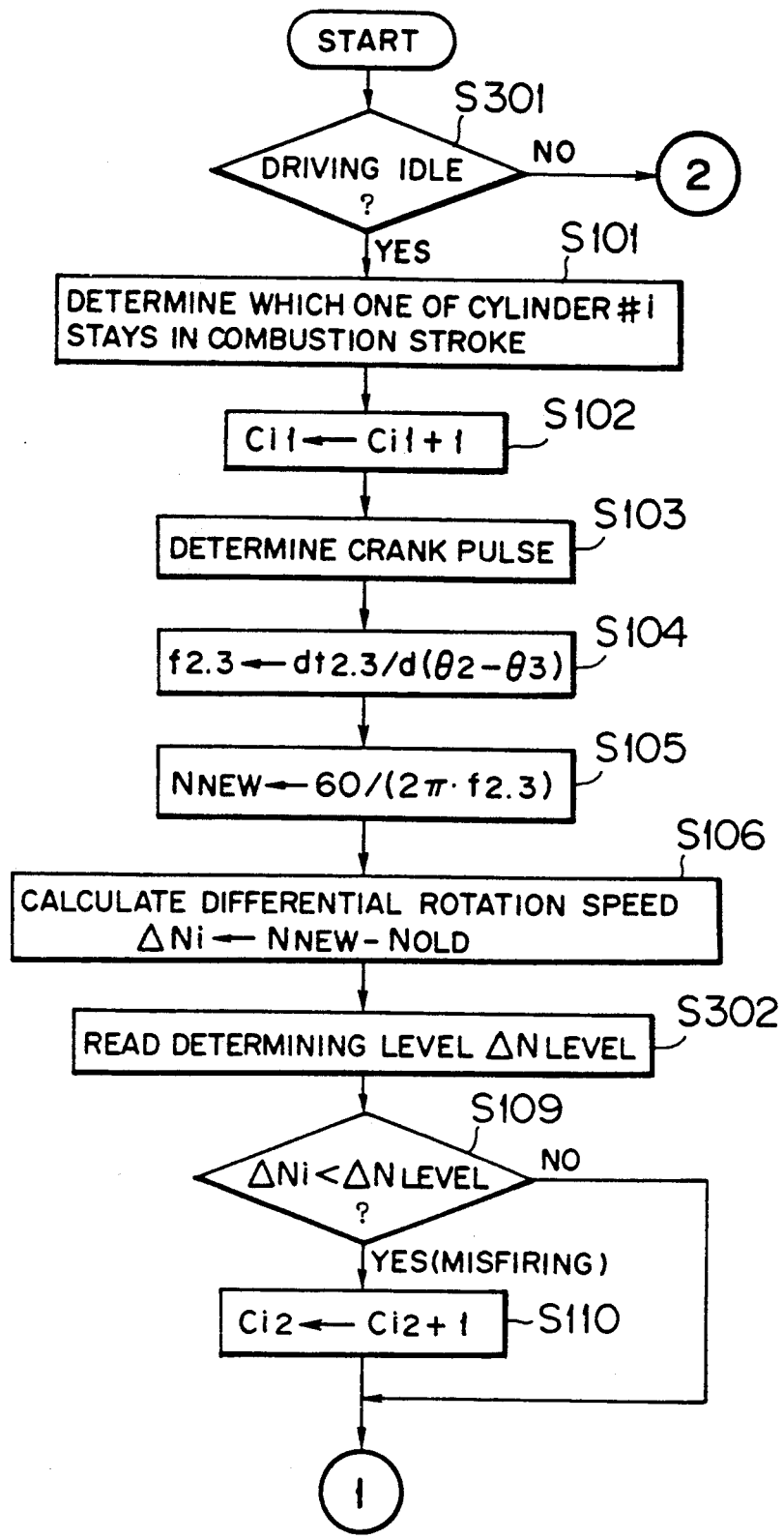
FIG. 13A and 13B are flowcharts illustrating a misfiring determining procedure.
Figure 13B:
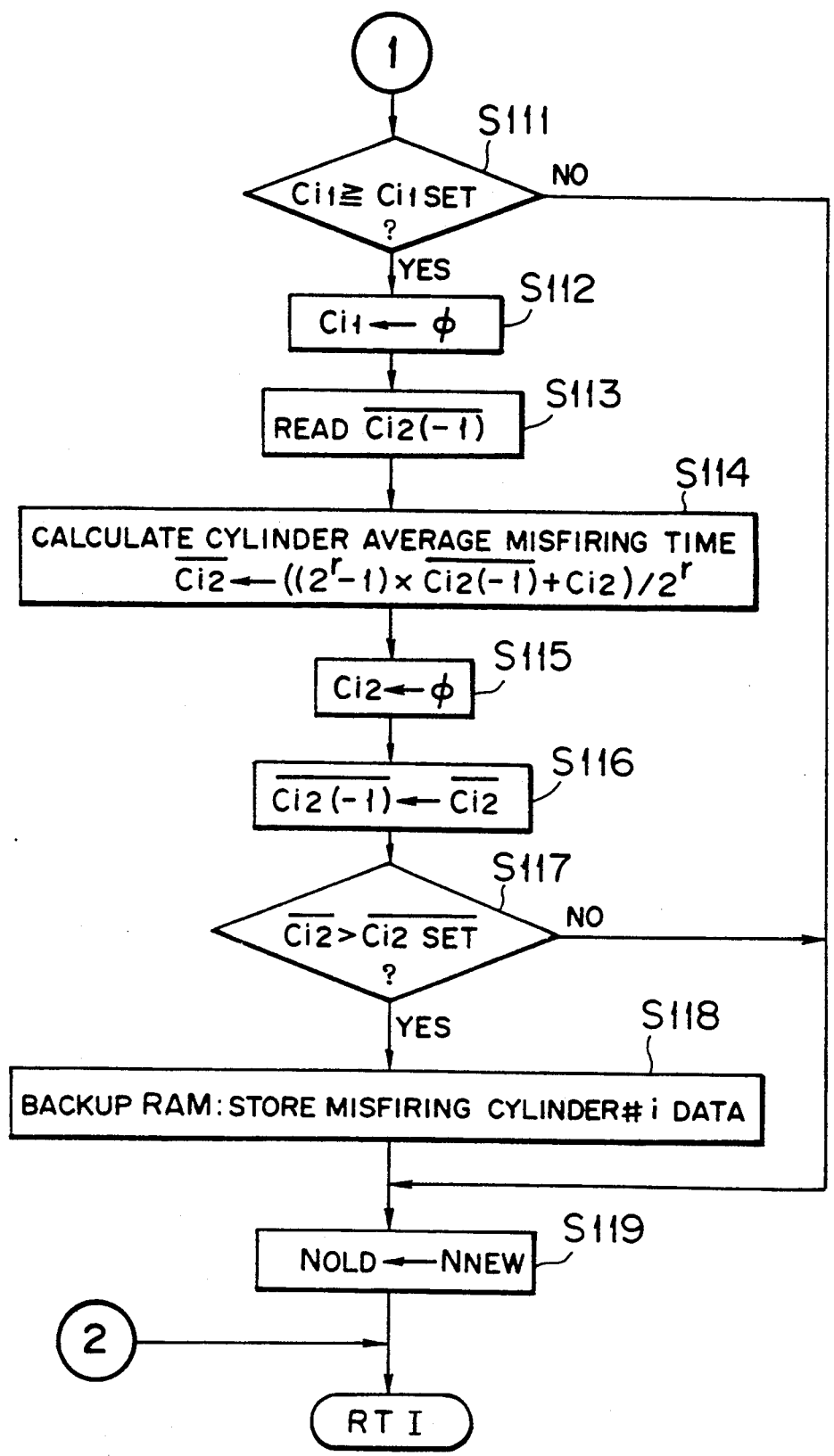

FIGS. 12 and 13 show the third embodiment of the present invention. FIG. 12 is a block diagram showing a control device and FIG. 13 is a flowchart showing a misfiring determining procedure.

The description is left out about the means and steps having the same function as those described with respect to the first embodiment.

The third embodiment is designed to determine if the misfiring has occurred when driving the car idle.

An idle-driving determining means 71 serves to determine whether or not the car is driven idle in the light of the car speed sensed by a car speed sensor 24 and an output signal of an idle switch 9b.

A misfiring determining means 72 serves to compare the differential rotation speed $\Delta Ni$ of the combustion-stroke cylinder #i calculated at the differential rotation speed calculating means 44 with the predetermined misfiring determining level $\Delta N$ LEVEL and determine if the misfiring has occurred in the cylinder #i.

When driving idle, the engine rotation number is low and the load variation is small. Hence, if the misfiring determining level $\Delta N$ LEVEL may be not a variable as described with respect to the first embodiment but a constant obtained by an experiment, no error is determined.

Figure 14:
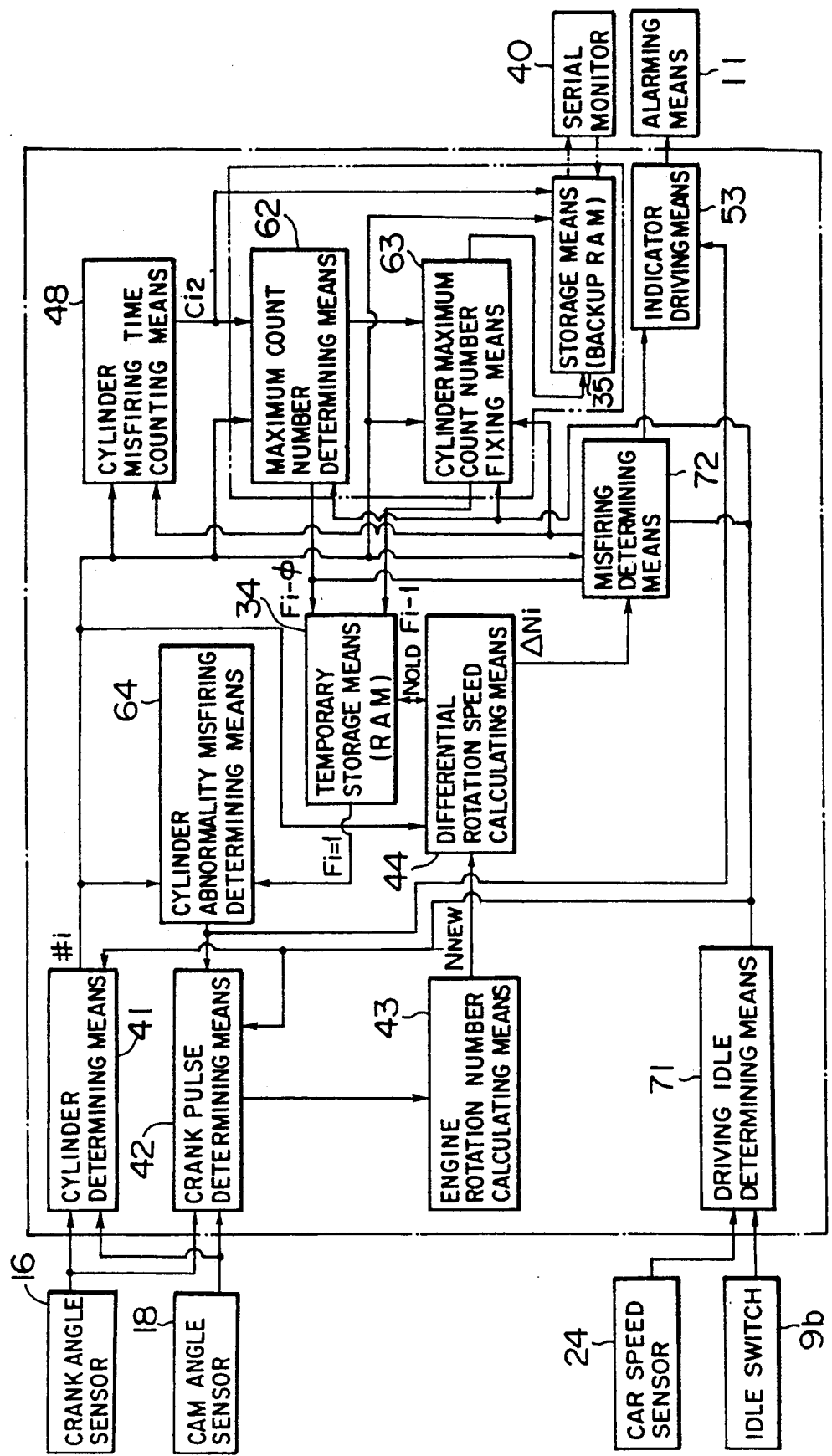
FIG. 14 is a block diagram showing a control device of a fourth embodiment of the present invention.

The third embodiment has the same misfiring determining procedure as that shown in FIG. 10. As shown in FIG. 14, there exist some different respects. That is, at a step S301, the program determines if the car is driven idle. If no, the program escapes out of the routine. If yes, the program goes to the step S101. And, unlike the steps S107 and S108 of the first embodiment, at a step S302, the fixed misfiring determining level $\Delta N$ LEVEL stored at the ROM is read out.

Fourth Embodiment

Figure 15A:
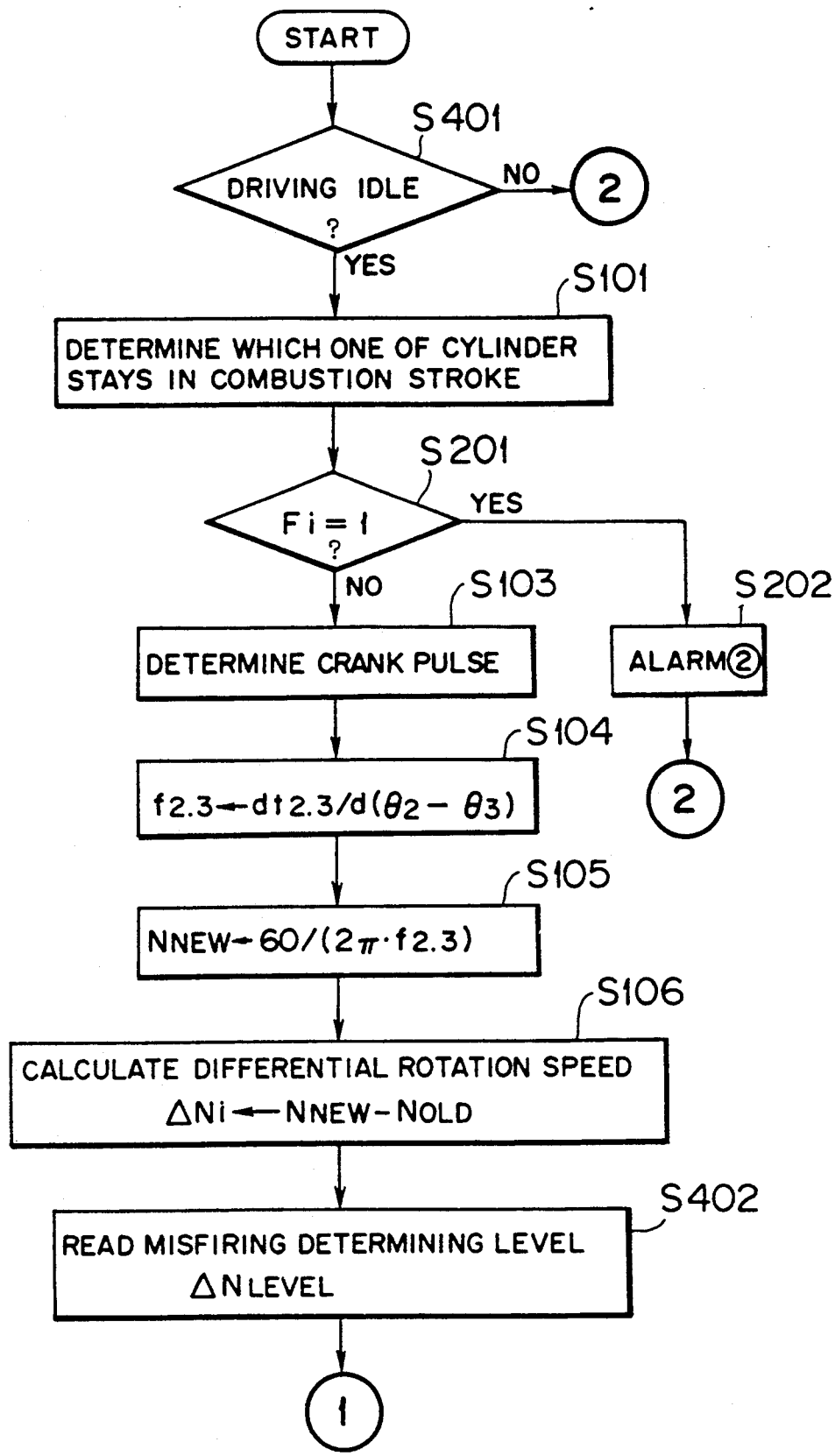
FIG. 15A and 15B are flowcharts illustrating a misfiring determining procedure.
Figure 15B:
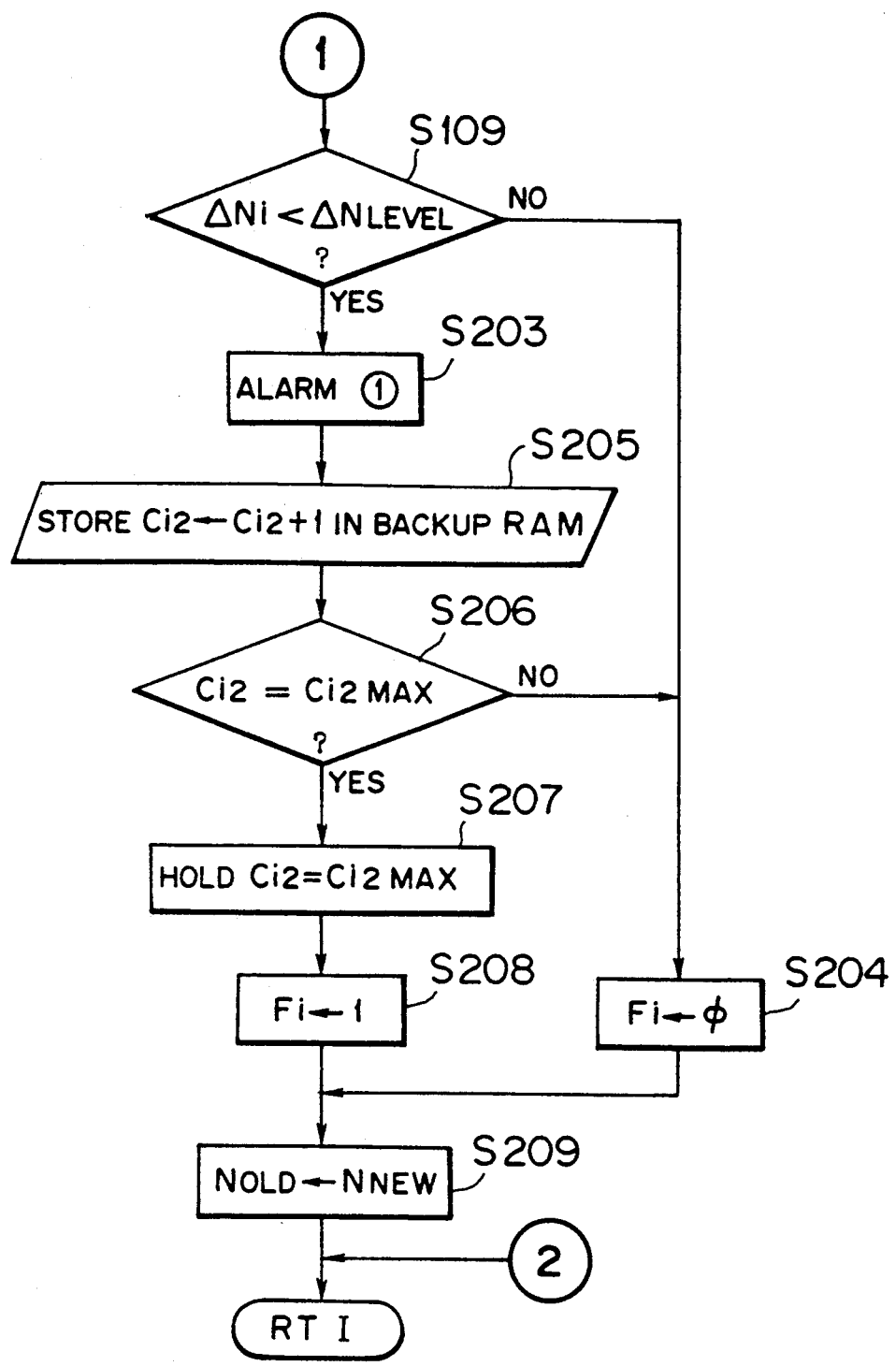

FIGS. 14 and 15 concern with the fourth embodiment of the invention. FIG. 14 is a functional block diagram showing a control device. FIG. 15 is a flowchart showing a misfiring determining procedure.

The description is left out about the means and steps having the same function as those described with respect to the second embodiment.

The fourth embodiment is designed to sequentially store the misfiring time of each cylinder when driving idle and fixed-store the maximum misfiring time if the misfiring time reaches the maximum count number.

Like the foregoing third embodiment, an idle-driving determining means 71 serves to determine whether the vehicle speed =0 or not, with a vehicle speed sensor 24 and whether the throttle valve is full closed or not responsive to the output signal of the idle switch 9b. If yes, the program determines that the engine is idling and outputs an operation-starting signal to each means.

A misfiring determining means 72 serves to compare the differential rotation speed $\Delta Ni$ calculated at the differential rotation speed calculating means 44 with the fixed misfiring determining level $\Delta N$ LEVEL for determining if the misfiring has occurred in the cylinder #i.

The misfiring determining procedure of the fourth embodiment is substantially same as that shown in FIG. 12, except that the idle-driving is determined at the S401 and the fixed misfiring determining level $\Delta N$ LEVEL is read out at the step S402.

The steps S401 and S402 are not described, because these steps correspond to the steps S301 and S302 of the foregoing third embodiment.

In addition, the foregoing embodiments have been using the engine rotation number as momentum. Instead, they may use a period, an angular speed or an angular acceleration.

As described above, the present invention is designed to compare the momentums of the intervals where no combustion work is done with each other for calculating the momentum variation. Hence, the comparison is executed without containing a factor varying the rotation number, the factor resulting from the combustion pressure of the other cylinder. It results in making it possible to compare both momentums under the same condition and accurately presume the combustion state of each cylinder. The determining reference is thus made clear so that the misfiring can be accurately determined.

Further, the invention has a function of averaging the misfiring time of each cylinder at each predetermined cycle. This function is effective in modifying temporary misfiring determination resulting from the abrupt combustion variation. It results in improving the accuracy of the misfiring determination.

The invention has another function of comparing the averaged misfiring time with the predetermined misfiring determining reference time for detecting the abnormal misfiring in each cylinder. The function makes it possible to clearly determine whether the misfiring of the cylinder is allowable or not.

If the actually counted misfiring time of each cylinder reaches the maximum count number, the invention serves to fixed-store the maximum count number. There is no overflow if the misfiring time is greater than the maximum count number, thereby being able to effectively determine the misfiring state in maintenance of or checking for the car.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A misfiring determining device for an engine including a device for monitoring a combustion state of each cylinder provided in a multi-cylinder engine and for determining an occurrence of abnormal combustion in the cylinder, comprising:

calculating means for comparing a first engine speed for a first time interval before combustion with a second engine speed for a second time interval after combustion and for calculating an engine speed variation between said first engine speed and said second engine speed;

misfiring determining means for comparing said engine speed variation with a misfiring determining level for determining a misfiring state;

cylinder misfiring time counting means for counting number of times of the misfiring in the cylinder;

operating cycle number counting means for counting the number of an operating cycle for calculating the engine speed variation of each cylinder;

cycle number determining means for supplying an output when the operating cycle number counted by said operating cycle number counting means reaches a predetermined sampling cycle number;

cylinder average misfiring time calculating means for calculating a current average number of times of misfiring based on said number of times of the misfiring counted by said cylinder misfiring counting means and a previous average number of times of the misfiring when the cycle number determining means supplies the output; and cylinder abnormal misfiring determining means for comparing said current average number of times of the misfiring given by said average misfiring time calculating means with a predetermined misfiring time maximum value and storing abnormal misfiring data when the current average number of times of the misfiring reaches the predetermined misfiring time maximum value.

2. The misfiring determining device for an engine, comprising:

measuring means for measuring a first engine speed for a first time interval before a combustion in a specific cylinder of said engine and a second engine speed for a second time interval after said combustion;

calculating means for calculating an engine speed variation between said first engine speed and said second engine speed;

misfire determining means for determining a misfire state of said specific cylinder by comparing said engine speed variation with a preset misfiring determining level, thereby accurately determining that said misfiring occurs;

counting means for counting up a number of times of said misfiring in each cylinder for a preset period when said misfiring is determined by said misfiring determining means;

averaging means for calculating a present average value of the number of times of said misfiring by taking an average between a previous average value of the number of times of said misfiring and said number of times of said misfiring counted by said counting means; and abnormal combustion determining means for determining an abnormal combustion state in said specific cylinder when said present average of the number of times of said misfiring becomes larger than a preset value.

* * * * *